W. S. SUTTON.
POSITIVE OILING DEVICE FOR BEARINGS.
APPLICATION FILED JULY 29, 1907.
1,015,095.
Patented Jan. 16, 1912.
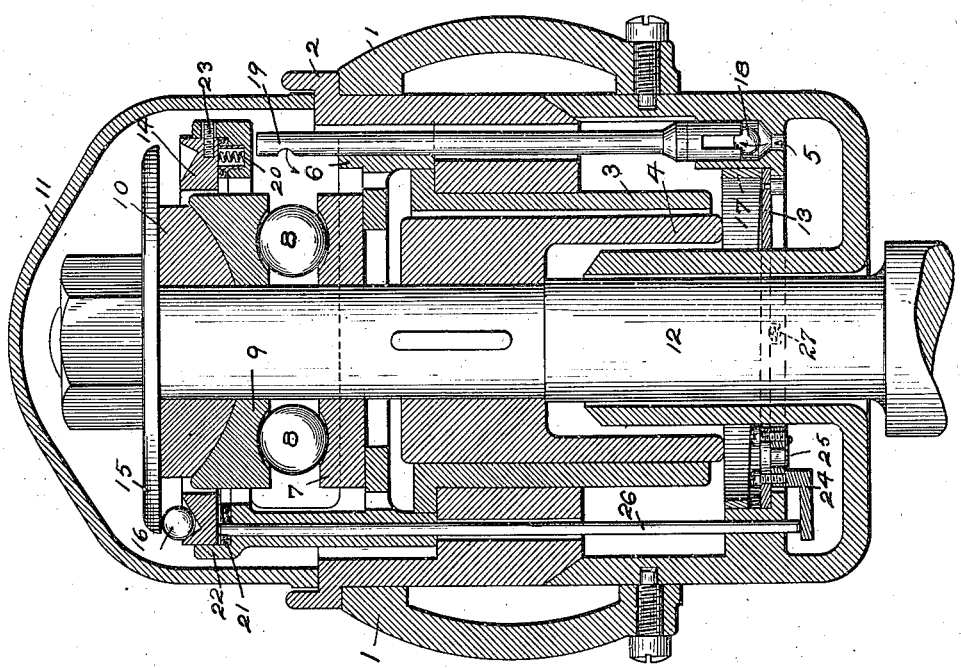
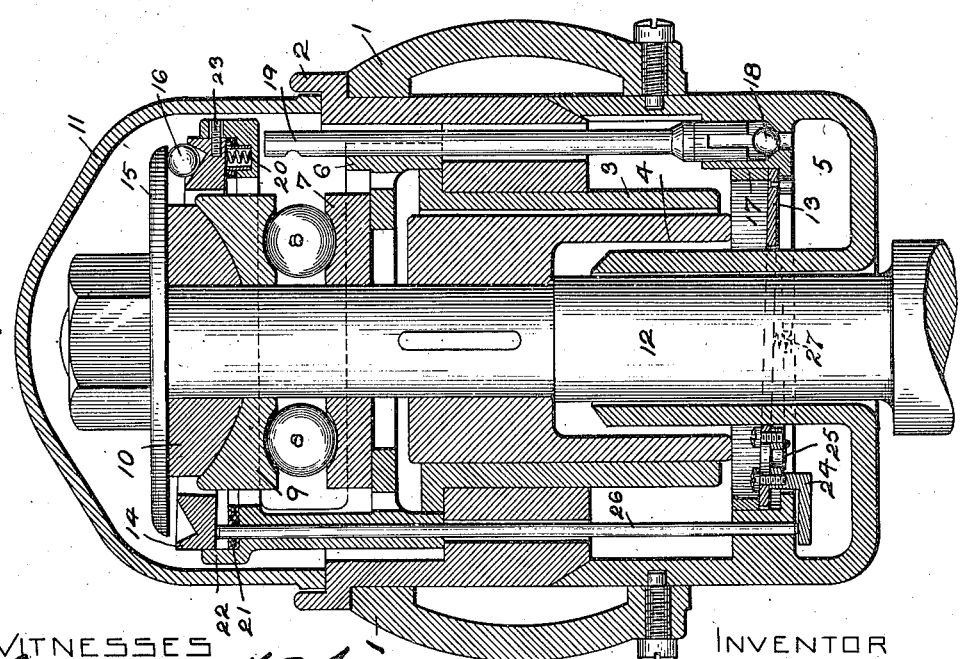
WITNESSES
INVENTOR
WILLIAM S. SUTTON.
by
ATTY

UNITED STATES PATENT OFFICE.

WILLIAM S. SUTTON, OF MADISON, WISCONSIN, ASSIGNOR, BY MESNE ASSIGNMENTS, TO GENERAL ELECTRIC COMPANY, A CORPORATION OF NEW YORK.

POSITIVE OILING DEVICE FOR BEARINGS.

1,015,095.  Specification of Letters Patent.  Patented Jan. 16, 1912.

Application filed July 29, 1907. Serial No. 386,051.

*To all whom it may concern:*

Be it known that I, WILLIAM S. SUTTON, a citizen of the United States, residing at Madison, county of Dane, State of Wisconsin, have invented certain new and useful Improvements in Positive Oiling Devices for Bearings, of which the following is a specification.

My invention relates to a new device for positively oiling bearings, and has for its object a novel construction and arrangement of parts.

The various forms of novelty which characterize my invention are pointed out with particularity in the claims annexed to and forming a part of this specification.

For a better understanding of my invention, reference may be had to the following description taken in connection with the accompanying drawing in which—

Figures 1 and 2 show sections through the center line of a ball thrust bearing provided with my invention; Fig. 1 showing the position of the actuating parts at one limit of movement of the pump plunger; and Fig. 2 the position of these parts at the other limit of movement.

The corresponding parts in the two figures are indicated by the same numerals.

In the particular form in which I have illustrated my invention, I have shown a pump, consisting of a disk or plunger at the lower part of the ball thrust bearing actuated by a rod which extends to the upper part of the bearing. Motion is imparted to this rod by means of a member carried by the shaft, another member moving transversely thereto and operatively connected to the rod, and a device rolling between these members.

1 is the frame or bonnet supporting the bearing.

2 is the bonnet sleeve which supports the bronze bearing sleeve 3.

4 is a journal sleeve running in the bearing sleeve 3 and attached to the shaft 12. The shaft bearing illustrated has the lower ball race 7, provided with a race to receive the balls 8, above which balls is the upper ball race 9. The upper ball race 9 is provided with a bearing or track for the balls and concaved on its upper side to receive a correspondingly convexed bearing block 10, the mutual action between these two members distributing the strain equally over the whole ball race. The upper end of the shaft is threaded to receive a nut or otherwise provided with means whereby the weight is sustained by the ball races which are supported by a shim 6 and the bearing sleeve 3. A cap 11 is placed over the bearing to protect it from dust and prevent oil from being thrown out of the bearing. A suitable oil chamber 5 with suitable openings and means for holding is also provided at the bottom of the bearing.

The shim 6 supporting the ball race 7 is provided with upwardly extending columns connected with a recessed ring 22 which supports an oscillating ball race 14. The shaft 12 carries the disk or ball race 15 which also acts as a washer for supporting in position the self-adjusting step 10 and with respect to which the ball race 14 moves transversely. Between this race and the race 14 a ball 16 runs. The race 14 is in contact with the rod 26, at its upper end, which rod actuates the pump. The lower end is in contact with the bracket 24, and the rod is pressed upward by it. The bracket 24 is fastened to the disk or pump plunger 13 by screws as shown, and permits the rods to pass down in a vertical position, which is preferable for mechanical reasons to having the rod inclined and resting on the upper side of the disk. The retaining ring 17 is narrower at one part than the other, which enables the disk 13 to assume a position which will admit of a slight oscillating motion. The disk 13 is pressed upward against the retaining ring by suitable means, such as by the springs 27, shown in dotted lines on the drawing. To insure free inlet of oil after the disk has been depressed, the disk may have a check valve 25.

In order to avoid any noise which might result from the ball race 14 vibrating in contact with the recessed ring 22, a leather or other suitable washer 21 is provided between the ball race and ring. To insure a slight pressure at the point in the ball race where the ball might be inactive a small spring 20 is inserted under the ball race 14. This ball race is retained in position at one point on its periphery by a small screw stud 23 which is placed diametrically opposite the connection to the pump, that is, diametrically opposite the rod 26.

The oil tube 19 communicates with the oil chamber 5, through the ball check valve 18.

The operation of my device is shown by the drawing. In Fig. 1 the ball 16 is in the extreme position of the race 14, where the disk 13 is pressed upward against the retaining ring 17, as there is no downward pressure on the rod 26. The check valve 25 has just closed, oil having flowed through it and filled the oil chamber 5. As the shaft rotates and the upper race 15 with it, the ball moves also and the race 14 is gradually pressed downward, exerting a pressure on the rod 26, which pressure is communicated to the disk 13 through the bracket 24. As this disk starts downward the check valve 25 closes due to the pressure on its under side, the ball valve 18 opens due to the pressure, and oil is pumped up through the oil tube 19, through the hole at the top of the tube, on to the surface to be lubricated. This continues until the ball 16 reaches the other extreme position of the race shown in Fig. 2. When the ball has passed this position and approaches the position in Fig. 1 again, the spring pressure on the disk gradually forces it and the rod and ball race 14 upward, the pressure in the oil chamber 5 is relased, the check valve 25 opens and allows the oil to flow into the oil chamber 5, and the ball valve 18 closes.

A preferred design of the device is shown in the drawings, but it is evident that the parts of the device may be given other forms without departing from the spirit of my invention. It may also be used with other forms of bearings than the ball bearing shown.

What I claim as new and desire to secure by Letters Patent of the United States, is,—

1. In combination with a shaft to be lubricated, an oiling device comprising a yieldingly supported member having a bearing surface inclined to the axis of rotation of the shaft, and a device driven by said shaft and pressing on said bearing surface, and a pump operatively connected to said member.

2. An oiling device comprising in combination two members with opposing bearing surfaces normally lying in different planes, one of said members being transversely movable with respect to the other, a device adapted to move between said bearing surfaces and thereby actuate the movable member, and a pump operatively connected to the movable member.

3. An oiling device comprising in combination two members, one of said members being transversely movable with respect to the other, said members having opposing bearing surfaces normally lying in different planes, a device adapted to roll between said bearing surfaces and thereby actuate the movable member, and a pump operatively connected to the movable member.

4. An oiling device comprising in combination two members, one of said members being transversely movable with respect to the other and yieldingly supported, said members having opposing bearing surfaces normally lying in different planes, a device adapted to roll between said bearing surfaces, and thereby actuate the movable member, and a pump operatively connected to the movable member.

5. An oiling device comprising in combination two members with opposing bearing surfaces, one of said members being transversely movable with respect to the other and spring supported, a device adapted to move between said bearing surfaces and thereby actuate the movable member, and a pump operatively connected to the movable member.

6. An oiling device comprising in combination a pump, ball races, a ball moving in said races, one of said races being transversely movable with respect to the other and operatively connected to the pump, and means for moving said ball.

7. An oiling device comprising in combination, a pump, ball races, and a ball moving in said races, one of said races being transversely movable with respect to the other, yieldingly supported and operatively connected to the pump, and means for moving said ball.

8. An oiling device comprising in combination a pump, ball races and a ball moving in said races, one of said races being transversely movable with respect to the other, spring supported and operatively connected to the pump, and means for moving said ball.

9. In combination with a member to be lubricated, an oiling device consisting of a pump, ball races, and a ball moving in said races and actuated by said member, one of said races being transversely movable with respect to the other, yieldingly supported and operatively connected to the pump.

10. An oiling device comprising a pump, ball races and a ball moving in said races, one of said races being transversely movable with respect to the other, yieldingly supported and operatively connected to the pump, means for retaining said movable race in position at one point diametrically opposite the connection to the pump, the bearing surfaces of the races normally lying in different planes, and means for moving said ball.

11. In combination with a shaft to be lubricated, an oiling device consisting of a pump, ball races and a ball moving in said races, one of said races being transversely movable with respect to the other, yieldingly supported and surrounding the shaft, said race being operatively connected to the pump, the other race being connected to the shaft and rotated thereby.

12. An oiling device consisting of a pump, comprising a disk plunger and operating rod therefor, ball races, and a ball moving in said races, one of said races being transversely movable with respect to the other and in contact with said rod, and means for moving said ball.

13. An oiling device consisting of a pump, comprising a disk plunger, an operating rod therefor, said disk plunger having a check valve, ball races, and a ball moving in said races, one of said races being transversely movable and in contact with said rod, and means for moving said ball.

14. An oiling device consisting of a pump, having a plunger, ball races and a ball moving in said races, one of said ball races being transversely movable with respect to the other, inclined thereto, and operatively connected to the plunger, elastic means for supporting said race and plunger in their inclined position, and means for moving said ball.

15. An oiling device consisting of a pump having a disk plunger, an operating rod therefor, ball races, and a ball moving in said races, one of said races being transversely movable with respect to the other and in contact with said rod, springs pressing against said disk and opposing the pressure of said rod, and means for moving said ball.

16. In combination with a shaft to be lubricated, a vertical bearing, an oil chamber below the bearing, a pump in said oil chamber, an oil tube leading to the bearing, and means for operating the pump intermittently comprising a yieldingly supported member having a bearing surface inclined to the axis of the shaft and to which said pump is operatively connected, and a device driven by the shaft and pressing on said bearing surface.

17. In combination with a shaft to be lubricated, a vertical bearing, an oil chamber below the bearing, a pump in said oil chamber, and means operating said pump comprising ball races and a ball moving in said races, one of said races being transversely movable with respect to the other, yieldingly supported and operatively connected to said pump.

In witness whereof, I have hereunto set my hand this 17th day of July, 1907.

WILLIAM S. SUTTON.

Witnesses:
 WM. C. PETERSON,
 G. J. LILLESAND.